United States Patent
Kunz

(10) Patent No.: US 9,079,572 B2
(45) Date of Patent: Jul. 14, 2015

(54) MAIN BRAKE CYLINDER FOR A HYDRAULIC VEHICLE BRAKE SYSTEM AND METHOD FOR OPERATING SAME

(75) Inventor: Michael Kunz, Steinheim An der Murr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/518,229

(22) PCT Filed: Oct. 28, 2010

(86) PCT No.: PCT/EP2010/066344
§ 371 (c)(1),
(2), (4) Date: Jun. 21, 2012

(87) PCT Pub. No.: WO2011/085836
PCT Pub. Date: Jul. 21, 2011

(65) Prior Publication Data
US 2012/0256476 A1   Oct. 11, 2012

(30) Foreign Application Priority Data

Dec. 22, 2009  (DE) .......................... 10 2009 055 117

(51) Int. Cl.
| B60T 13/58 | (2006.01) |
| B60T 8/38 | (2006.01) |
| B60T 7/04 | (2006.01) |
| B60T 8/40 | (2006.01) |
| B60T 13/16 | (2006.01) |

(52) U.S. Cl.
CPC . B60T 8/38 (2013.01); B60T 7/042 (2013.01); B60T 8/4081 (2013.01); B60T 13/165 (2013.01)

(58) Field of Classification Search
CPC ...... B60T 8/4081; B60T 11/16; B60T 11/224
USPC ...................... 188/347; 303/151, 152; 60/592
See application file for complete search history.

(56) References Cited

U.S. PATENT DOCUMENTS

| 3,499,287 A | * | 3/1970 | Schrader | ........................ 60/562 |
| 6,120,115 A | * | 9/2000 | Manabe | ....................... 303/152 |
| 2005/0225167 A1 | * | 10/2005 | Kunz | ........................ 303/115.1 |

(Continued)

FOREIGN PATENT DOCUMENTS

| CN | 101242981 A | 8/2008 |
| DE | 195 00 544 A1 | 7/1998 |

(Continued)

OTHER PUBLICATIONS

International Search Report corresponding to PCT Application No. PCT/EP2010/066344, mailed Mar. 16, 2011 (German and English language document) (7 pages).

*Primary Examiner* — Bradley King
(74) *Attorney, Agent, or Firm* — Maginot, Moore & Beck LLP

(57) ABSTRACT

A main brake cylinder for a hydraulic vehicle brake system of a motor vehicle is disclosed. The main brake cylinder includes an electric motor that is operated as a generator for decelerating the motor vehicle. For service braking, pressure is applied to a brake circuit by the main brake cylinder and to another brake circuit by a hydraulic pump. In order to reduce a pedal force, a first piston has a smaller piston surface and a second piston only moves if a greater brake fluid volume is required. A preloaded hydraulic accumulator limits an increase in pressure.

13 Claims, 1 Drawing Sheet

(56) References Cited

U.S. PATENT DOCUMENTS

2005/0227661 A1  10/2005  Ginzburg
2009/0299591 A1* 12/2009  Broeckel et al. ............... 701/70

FOREIGN PATENT DOCUMENTS

| | | |
|---|---|---|
| DE | 199 05 660 A1 | 5/2000 |
| DE | 101 19 128 A1 | 9/2002 |
| DE | 102 23 799 A1 | 5/2003 |
| DE | 102 33 838 A1 | 2/2004 |
| DE | 103 24 246 A1 | 12/2004 |
| DE | 103 42 937 A1 | 4/2005 |
| DE | 10 2005 039 314 A1 | 2/2007 |
| DE | 10 2008 003 664 A1 | 7/2009 |
| DE | 10 2008 001 013 A1 | 10/2009 |
| EP | 1 103 436 A2 | 5/2001 |
| JP | 2001227661 A | 8/2001 |
| JP | 2005-533720 A | 11/2005 |
| JP | 2006-231138 A | 9/2006 |
| JP | 2009-286170 A | 12/2009 |

* cited by examiner

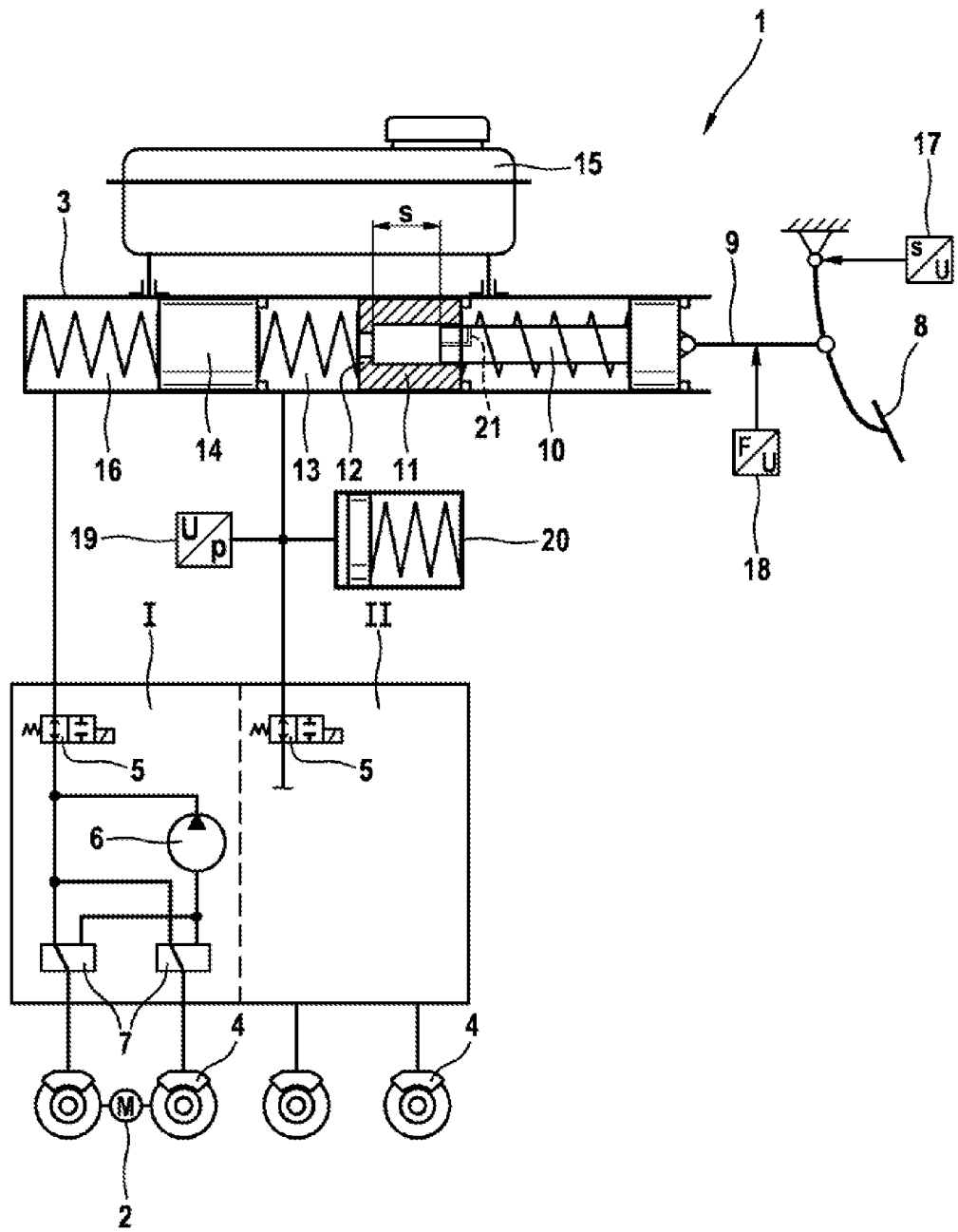

MAIN BRAKE CYLINDER FOR A HYDRAULIC VEHICLE BRAKE SYSTEM AND METHOD FOR OPERATING SAME

This application is a 35 U.S.C. §371 National Stage Application of PCT/EP2010/066344, filed on Oct. 28, 2010, which claims the benefit of priority to Ser. No. DE 10 2009 055 117.4, filed on Dec. 22, 2009 in Germany, the disclosures of which are incorporated herein by reference in their entirety.

The disclosure relates to a master brake cylinder for a hydraulic vehicle brake system, and a method for its operation.

BACKGROUND

Hybrid vehicles are known which have an internal combustion engine and one (or more) electric motor(s) for their propulsion. To decelerate such motor vehicles, the electric motor can be operated as a generator and the current generated stored in an accumulator. Decelerating the motor vehicle with the electric motor operated as a generator is called recuperative braking. The electric motor can generally be regarded as an electric machine, for example it can also be a generator.

To achieve a specific deceleration, a braking effect of the hydraulic vehicle brake system must be reduced by the deceleration effect of the electric machine operated as a generator. In simple systems, a vehicle driver must compensate for the braking effect of the electric machine operated as a generator or the deceleration of the motor vehicle is increased via the braking effect of the vehicle brake system by the deceleration effect of the electric machine operated as a generator.

In more complex systems, an attempt is made to compensate automatically for the deceleration effect of the electric drive machine operated as a generator by reducing the braking effect of the hydraulic vehicle brake system, wherein the compensation succeeds to a greater or lesser extent. Compensation for the deceleration effect of the electric machine operated as a generator by reducing the braking effect of the vehicle brake system is called covering. Efforts are focused on not only compensating to a greater or lesser extent for the deceleration effect of the electric machine operated as a generator, but also on ensuring that the pedal feel at a brake pedal (or handbrake lever) remains as unchanged as possible i.e. a vehicle driver where possible does not perceive or perceives very slightly that the motor vehicle is being decelerated to a greater or lesser extent by the electric machine operated as a generator and the braking effect of the vehicle brake system is reduced accordingly.

One difficulty in such covering is that the deceleration effect of the electric machine operated as a generator depends on various circumstances and changes during braking. One such circumstance is that the braking effect of the electric machine operated as a generator diminishes as the vehicle speed diminishes, down to zero when stopped. A charge state of the accumulator is another such circumstance: if the accumulator is fully charged and therefore cannot receive any electric current, generator operation of the electric machine is not possible and the motor vehicle must be braked conventionally exclusively by the hydraulic vehicle brake system. Shift processes also cause sudden changes in the deceleration effect of the electric machine operated as a generator if this is decoupled on decoupling the vehicle wheels.

Publication DE 10 2008 003 664 A1 discloses a hydraulic vehicle brake system with a slip control for a hybrid vehicle. In service braking, a brake circuit is isolated hydraulically from a master brake cylinder by closing an isolating valve and a wheel brake pressure is generated with a hydraulic pump, and as in slip control, regulated by brake pressure build-up and brake pressure reduction valves. Regulation in the sense of the disclosure also means control. The wheel brake pressure is reduced by the amount corresponding to the deceleration by an electric machine of the motor vehicle operated as a generator, wherein a total deceleration of the motor vehicle with the electric machine operated as a generator and the hydraulic vehicle brake system should correspond as precisely as possible to a deceleration which would be achieved by braking exclusively by activating the vehicle brake system with a master brake cylinder and without the electric machine in generator operation. An activation travel and/or activation force of the master brake cylinder and/or a master brake cylinder pressure constitutes a nominal value for the braking effect. A vehicle driver during braking should not perceive that part of the deceleration is achieved by the electric machine operated as a generator. A changing deceleration effect of the electric machine operated as a generator during braking should be as imperceptible as possible. A second brake circuit is activated in the conventional manner with the master brake cylinder in the known vehicle brake system, where no regulation intervention occurs on braking to compensate for the deceleration effect of the electric machine operated as a generator.

Publication DE 102 33 838 A1 discloses a master brake cylinder for an electro-hydraulic i.e. external energy vehicle brake system. The master brake cylinder has two pistons for a brake circuit, one of which as a so-called rod piston is mechanically connected with a brake pedal. A carrier device carries a second piston which pressurizes the same brake circuit after a pre-specified piston travel of the first piston. Until the second piston moves with the first piston, an effective piston surface of the first piston is smaller than the effective piston surface of both pistons together when, after covering the pre-specified piston travel, both pistons move. The smaller effective piston surface causes a lower activation force at a given master brake cylinder pressure. As a result the pedal force rise is reduced when the master brake cylinder is isolated hydraulically from the vehicle brake system by closure of an isolation valve for an external energy brake. The vehicle brake system is not braked with the master brake cylinder, the master brake cylinder serves as a nominal value emitter for a braking force to be set. A hydro-accumulator communicating with the master brake cylinder receives brake fluid which is displaced from the master brake cylinder on activation.

The movement travel of the first piston until carrying the second piston is dimensioned such that normally in service braking only the first piston is moved. The second piston which enlarges the effective piston surface is provided for auxiliary braking in the event of a fault in the external energy vehicle brake system. The second piston enlarges a brake fluid volume displaced from the master brake cylinder per piston stroke to activate the vehicle brake system with the master brake cylinder. The second piston is designed such that, on auxiliary braking in the event of a fault in the external energy vehicle brake system, sufficient brake fluid is displaced from the master brake cylinder to activate the vehicle brake system and that an activation travel of the master brake cylinder is not extended too far.

SUMMARY

The master brake cylinder according to the disclosure is intended for a hydraulic vehicle brake system of a motor vehicle which has an electric machine which can be operated as a generator for decelerating the motor vehicle. The electric machine is in particular an electric motor to drive the motor vehicle, several electric motors can also be provided for example for several or all vehicle wheels to drive the motor vehicle. The motor vehicle can for example be a hybrid vehicle with an internal combustion engine and one (or more) electric motor(s) for its drive, or an electric vehicle.

The master brake cylinder has two pistons for a brake circuit and a carrier device which, after movement of a first of the two pistons by a pre-specified piston travel, moves the second piston with the first. As long as only the first piston moves, the effective piston surface is smaller than when, after covering the pre-specified piston travel, both pistons move together. The first piston is in particular a rod piston which is mechanically connected with a (foot) brake pedal, a (hand) brake lever or other control element, where applicable with the interposition of a brake force amplifier. The rod piston is also called the primary piston. Insofar as the vehicle brake system has more than one brake circuit, the master brake cylinder has separate brake pistons for the further brake circuit or circuits, in particular one or more so-called floating pistons, which are also called secondary pistons. The two pistons allocated to one brake circuit of the master brake cylinder can be arranged in a common cylinder or also in two cylinders arranged for example in parallel. For example the two pistons can be arranged inside each other in the master brake cylinder (claim 2). Because of the smaller effective surface if only the first piston is moved on activation of the master brake cylinder, the activation force is lower. If the master brake cylinder on braking is hydraulically isolated from the vehicle brake system or from a brake circuit of the vehicle brake system, due to the smaller effective piston surface a pedal feel at least similar to that of a conventional master brake cylinder can be achieved i.e. an at least approximately conventional pedal curve, wherein the pedal curve shows a dependency between the activation force and an activation travel of the master brake cylinder i.e. the movement travel of the piston. When the pre-specified piston travel is exceeded and both pistons are moved together, a brake fluid volume displaced from the master brake cylinder, depending on the piston travel, is larger so that sufficient brake fluid for activation of the vehicle brake system with the master brake cylinder is displaced therefrom and the necessary piston travel is not too long.

Furthermore the master brake cylinder according to the disclosure has a hydro-accumulator which communicates with the master brake cylinder and has a pretension. The pretension can be achieved by gas pressure or a mechanical spring, this list is not conclusive. The pretension of the hydro-accumulator is so great that it only receives brake fluid from the master brake cylinder when a master brake cylinder pressure is greater than a maximum design pressure of the vehicle brake system. The maximum design pressure of the vehicle brake system is the pressure which occurs at an assumed maximum muscle force exerted on the master brake cylinder. This means that the hydro-accumulator normally does not receive brake fluid either in service braking in which the master brake cylinder can be isolated hydraulically from the vehicle brake system or a brake circuit of the vehicle brake system, or on auxiliary braking in the event of a fault in the vehicle brake system. The hydro-accumulator limits the master brake cylinder pressure or reduces a maximum master brake cylinder pressure. It is particularly intended to prevent damage when the master brake cylinder is isolated from the vehicle brake system i.e. no brake fluid can be displaced therefrom into the vehicle brake system and only the first piston is moved. Because of the smaller effective piston surface of the first piston, the master brake cylinder pressure at a particular activation force is greater, the maximum design pressure of the vehicle brake system could thus be exceeded. To avoid this or limit or reduce the exceedance of the maximum design pressure, the hydro-accumulator has a pretension.

The disclosure is intended for motor vehicles which have an electric machine operated as a generator on brake activation to decelerate the vehicle and thus convert kinetic energy into electrical energy which can be stored in an accumulator and later used to accelerate or drive the motor vehicle. The conversion of kinetic energy into electrical energy on braking of a vehicle is also called recuperation. The electric machine is normally an electric drive motor (or several electric drive motors) of the motor vehicle which may also have an internal combustion engine for its propulsion and is then also called a hybrid vehicle, or which as an electric vehicle has exclusively one or more electric drive motors.

In such a vehicle the features of the disclosure are intended for a hydraulic vehicle brake system which brakes the vehicle wheels of one axle (front or rear axle) "by wire" i.e. by external force. A hydraulic brake pressure for external force braking can be generated with a hydraulic pump which is present in any case on vehicle system brakes with slip control. A wheel brake pressure is preferably controlled or regulated by solenoid valves. Also the pump pressure can be regulated by the pump rotation speed or by a solenoid valve. The external force braking circuit can be the or a brake circuit, the vehicle wheels of which are driven and braked by the electric drive motor, or it can be the other or another brake circuit. The other or another brake circuit is activated unchanged by muscle force, where applicable with support by a brake force amplifier, by the master brake cylinder. However the disclosure is not restricted to such vehicle brake systems.

In such vehicle brake systems two problems occur with opposite effects: because a brake circuit is isolated hydraulically from the master brake cylinder for braking, an activation travel i.e. a pedal travel of a brake pedal to achieve a particular brake effect, is shortened. Also an "elasticity" of the vehicle brake system is reduced, the brake pedal feels perceptibly harder on break activation when the master brake cylinder is isolated from a brake circuit and acts only on the other or another brake circuit. The disclosure counters this problem with a piston in the master brake cylinder, the diameter or piston surface of which is reduced i.e. is smaller than an internal diameter of the master brake cylinder. For a particular pedal travel, this piston displaces less brake fluid from the master brake cylinder, the activation travel or pedal travel is extended preferably to its normal extent. Also the "elasticity" or "pedal hardness" returns on brake activation because the activation force is smaller at a particular pressure because of the smaller piston surface.

With the smaller piston surface of the piston in the master brake cylinder however the second problem arises that the master brake cylinder pressure at a particular pedal force is greater. When a vehicle driver presses the brake pedal with maximum muscle force, the hydraulic pressure generated by this can damage or destroy the vehicle brake system. The disclosure counters this with the hydro-accumulator which has a pretension and receives the brake fluid displaced from the master brake cylinder when the pressure is greater than the pressure for which the vehicle brake system was designed. The hydraulic pressure in the vehicle brake system is thus restricted so that the vehicle brake system is not damaged. It need not therefore be designed for a higher pressure. In normal braking the hydro-accumulator because of its pretension does not come into operation i.e. does not receive brake fluid and therefore does not extend the activation travel or pedal travel of the master brake cylinder.

The second piston of the master brake cylinder according to the disclosure, which acts on the same brake circuit as the first piston and is carried by the first piston when the first piston has covered the pre-specified piston travel, enlarges the brake fluid volume displaced from the master brake cylinder at a particular piston travel to the normal extent, so that sufficient brake fluid is available for brake activation for auxiliary braking for example when the hydraulic pump is faulty.

Advantageous embodiments and refinements of the disclosure are also set forth below.

Claim 3 provides that the first piston isolates the master brake cylinder from a brake fluid storage reservoir after a short movement travel. This corresponds to the rod piston of a conventional master brake cylinder.

The master brake cylinder according to the disclosure can be designed as a single master brake cylinder i.e. for one brake circuit. The disclosure also describes a tandem or multicircuit master brake cylinder for a dual-circuit vehicle brake system. A master brake cylinder for more than two brake circuits is not excluded.

The disclosure also describes that for service braking, on activation of the master brake cylinder according to the disclosure, an electric machine of a motor vehicle fitted with the vehicle brake system is operated as a generator and the motor vehicle decelerated by this. Also the master brake cylinder is isolated from the vehicle brake system or from one (or more) brake circuit(s) of the vehicle brake system by closure of an isolating valve. In this brake circuit a wheel brake pressure is generated with a hydraulic pump and regulated such that a total deceleration effect of the electric machine operated as a generator and of the brake circuit isolated from the master brake cylinder and where applicable one or more further brake circuits is at least approximately as large as it would be on braking with the same activation force and/or same activation travel if the motor vehicle were decelerated exclusively by activation of the vehicle brake system with the master brake cylinder. Changes to the deceleration effect of the electric machine operated as a generator are regulated out so that this is as imperceptible as possible for the vehicle driver.

The wheel brake pressure can be regulated individually per wheel with brake pressure build-up valves and brake pressure reduction valves allocated to the wheel brakes, as known from slip control. The wheel brake pressure can also be regulated by rotation speed control of a drive of the hydraulic pump and/or one or more control valves which are connected before or after the hydraulic pump or with which the vehicle brake system or brake circuit can be connected to the pressureless brake fluid storage reservoir of the master brake cylinder. Also the wheel brake pressure of several wheel brakes, for example wheel brakes allocated to one vehicle axle, or all wheel brakes, can be regulated jointly. Regulation here as already stated also means control.

BRIEF DESCRIPTION OF THE DRAWING

The disclosure is now explained in more detail below with reference to an embodiment shown in the drawing. The sole figure shows a schematic depiction of a hydraulic vehicle brake system with a master brake cylinder according to the disclosure. The drawing should be regarded as a simplified depiction for ease of understanding and to explain the disclosure.

DETAILED DESCRIPTION

The hydraulic vehicle brake system 1 according to the disclosure shown in the drawing is provided for a hybrid vehicle (not shown) i.e. a motor vehicle with an internal combustion engine and an electric motor 2 as drive motors. The electric motor 2 acts on two wheels of a vehicle axle. Several electric motors can for example also be provided for individual or all vehicle wheels (not shown). The vehicle can also be a purely electric vehicle with propulsion by the electric motor 2 without an internal combustion engine. On braking the electric motor 2, generally described as an electric machine 2 and referred to as such below, is operated as a generator to generate electric power which is stored in an accumulator (not shown) and available for propulsion of the motor vehicle with the electric machine 2.

The vehicle brake system 1 is a dual-circuit vehicle brake system 1 with two brake circuits I, II which are connected to a tandem master brake cylinder 3. Connected to both brake circuits I, II are hydraulic wheel brakes 4, wherein the wheel brakes 4 of the vehicle wheels which can be driven by the electric machine 2 are connected to one brake circuit I and the other wheel brakes 4 to the other brake circuit II.

The vehicle brake system 1 has a slip control which is here shown greatly simplified and only in brake circuit I. The slip control has an isolating valve 5 via which the brake circuits I, II are connected to the master brake cylinder 3 and can be hydraulically isolated from the master brake cylinder 3 when the isolating valve 5 is closed. Furthermore the vehicle brake system 1 in each brake circuit I, II has a hydraulic pump 6 with which a braking pressure can be generated, and wheel brake pressure modulation valve assemblies 7 for each wheel brake 4 with which wheel brake pressures in brake cylinders of the wheel brakes 4 and hence braking forces of the wheel brakes 4 can be regulated individually. Such wheel brake pressure modulation valve assemblies 7 conventionally have a brake pressure build-up valve and a brake pressure reduction valve. Slip control systems with a hydraulic pump 6 and wheel brake pressure modulation valve assemblies 7 are known and will not be described in more detail here. It is essential that a brake pressure in brake circuits I, II can be generated independently of the master brake cylinder 3 with the hydraulic pumps 6 and the wheel brake pressures can be regulated, wherein individual wheel regulation of the wheel brake pressures is necessary for slip control but not for the disclosure. For the disclosure a common regulation of the wheel brake pressures of all wheel brakes 4 of a brake circuit I, II is sufficient, under certain circumstances even a common control of the wheel brake pressure of all wheel brakes 4 of the vehicle brake system 1. As well as with the wheel brake pressure modulation valve assemblies 7, the wheel brake pressure can be regulated for example by a rotation speed control of a drive of the hydraulic pump 6 or by a pressure-regulating valve (not shown), for example on a suction or pressure side of the hydraulic pump 6, with which the braking pressures in brake circuits I, II can be controlled. The brake circuit II (not shown) is constructed in the same fashion as the brake circuit I and functions in the same manner.

The master brake cylinder 3 according to the disclosure can be activated by muscle power, it has a brake pedal 8 for its activation which is connected via a piston rod 9 with a rod piston which can also be called a primary piston and is here known as first piston 10. The master brake cylinder 3 can comprise a brake force amplifier not shown here. The first piston 10 has a smaller diameter than the master brake cylinder 3. It is mobile in the master brake cylinder 3 and in a tubular second piston 11, the internal diameter of which corresponds to a diameter of the first piston 10 and the outer diameter of which corresponds to the diameter of the master brake cylinder 3. The term "diameter of the master brake cylinder 3" refers to its bore or inner diameter. The first piston 10 therefore lies within the second tubular piston 11. The second piston 11 has an inwardly protruding collar on its end remote from the pedal 8 which serves also as a stop for the first piston 10 or as a carrier device 12 for the second piston 11. The carrier device 12 causes the first piston 10 to be mobile over a pre-specified piston travel s without the second piston 11 in the master brake cylinder 3 and, after covering the pre-specified piston travel s, carries the second piston 12 with it. As soon as the first piston 10 makes contact with the inwardly protruding collar of the first piston 11, the two pistons 10, 11 move together in the master brake cylinder 3. The inwardly protruding collar of the second piston 11, as stated, forms a stop for the first piston 10 and a carrier device 12 for the second piston 11. As long as the first piston 10 alone moves in the brake cylinder 3, only its smaller piston surface is effective, if the two pistons 10, 11 move together however, the total piston surface of both pistons 10, 11 is effective.

The first piston 10 and the second piston 11 together act on a pressure chamber 13 of the master brake cylinder 3 and hence on a brake circuit II of the vehicle brake system 1. For the other brake circuit I, the master brake cylinder 3 has a floating piston 14 which in a known manner is moved by pressurization by the first piston 10 (rod piston) and where applicable also by the second piston 11 and in the event of a leak, mechanically by the first and/or second pistons 10, 11. This is known in itself and need not be explained further.

It should however be mentioned that the pressure chamber 13 pressurized by the first piston 10 communicates with a brake fluid storage reservoir 15 attached to the master brake cylinder 3, from which it is isolated in the conventional manner after a short movement travel of the first piston 10. This is achieved by a bore 21 in the first piston 10 which after a short movement travel of the first piston 10 is passed by the second unmoving piston 11 and closed thereby. Another possibility for isolating the pressure chamber 13 from the brake fluid storage reservoir 15 after a short movement travel of the first piston 10 is for example a so-called central valve integrated in the first piston 10, as is known in master brake cylinders (not shown).

On activation of the master brake cylinder 3 the isolating valve 5 of one of the two brake circuits I, II is closed and this brake circuit I, II is hydraulically isolated from the master brake cylinder 3. Preferably the isolating valve 5 of the brake circuit I is closed, to which circuit are connected the wheel brakes 4 of the vehicle wheels that can be driven with the electric machine 2. Also preferably the brake circuit I to which the wheel brakes 4 are connected, the wheels of which can be driven with the electric machine 2, is connected to a pressure chamber 16 of the master brake cylinder 3 which is pressurized by the floating piston 14. However it is also possible to connect the brake circuit II, the vehicle wheels of which do not have an electric machine, to the pressure chamber 16 of the master brake cylinder 3 pressurized by the floating piston 14 and/or isolate this hydraulically from the master brake cylinder 3 by closing the isolating valve 5. The brake circuit II, the isolating valve 5 of which on activation of the master brake cylinder 3 is not closed by the master brake cylinder 3, is conventionally activated by the hydraulic pressure which is built up in the master brake cylinder 3 by the activation and pressurizes the wheel brakes 4 connected to this brake circuit II. In the brake circuit I isolated from the master brake cylinder 3, a brake pressure is built up with hydraulic pump 6 and the wheel brake pressures in the connected wheel brakes 4 are regulated by the brake pressure modulation valve assemblies 7 or in another manner. The wheel brake pressures are reduced corresponding to a braking effect of the electric machine 2 which is operated as a generator during braking, fluctuations of the generator power and hence the deceleration effect of the electric machine 2 in generator operation are regulated out. A nominal value for the total deceleration of the motor vehicle by the wheel brakes 4 and the electric machine 2 in generator operation is specified by a pedal travel sensor 17, a pedal force sensor 18 and/or a pressure sensor 19 which measures a master brake cylinder pressure in a pressure chamber 13, 16 of the master brake cylinder 3. A braking force of wheel brakes 4 connected to brake circuit I, the isolating valve 5 of which is closed on brake activation, is reduced so greatly where possible that the deceleration effect of the electric machine 2 in generator operation is compensated for.

In the event of a fault (of the slip control) of the vehicle brake system 1, the isolating valves 5 of brake circuits I, II remain open and braking takes place by pressurization of all wheel brakes 4 with the master brake cylinder 3.

The smaller piston surface of the first piston 10 for a particular pedal travel causes a lower pressure build-up and hence a lower pedal force. A pedal curve i.e. the dependency of the pedal force on the pedal travel is thus adapted to usual conditions of a master brake cylinder, the rod piston of which has the diameter of the master brake cylinder. A vehicle driver has at least an approximately normal pedal feel. The pre-specified piston travel s of the first piston 10 before resting on the carrier device 12 of the second piston is dimensioned so long that in normal driving operation it is sufficient even for severe braking, normally therefore only the first piston 10 (and where applicable the floating piston 14) but not the second piston 11 is moved.

On auxiliary braking in the event of a fault, both isolating valves 5 remain open and the wheel brakes 4 of both brake circuits I, II are activated with the master brake cylinder 3, it can occur that the brake fluid volume displaced by the first piston 10 from the master brake cylinder 3 is not sufficient. Then the first piston 10 on brake activation contacts the carrier device 12 of the second piston 11 and carries the second piston 11 with it. The resulting larger effective piston surface of the first and second pistons 10, 11 causes a displacement of more brake fluid per pedal travel from the master brake cylinder 3, which is sufficient for brake activation. Also the greater effective piston surface area on movement of the first and second pistons 10, 11 shortens the pedal travel necessary to increase the master brake cylinder pressure.

A pretensioned hydro-accumulator 20 is connected to the pressure chamber 13 of the master brake cylinder 16. In the embodiment shown the hydro-accumulator 20 is connected to the pressure chamber 13 which is pressurized by the first and second pistons 10, 11. However the hydro-accumulator 20 can also be connected to the pressure chamber 16 pressurized by the floating piston 14 (not shown). The hydro-accumulator 20 can for example be pretensioned with a mechanical spring and/or with gas pressure, this list is not conclusive. The pretension of the hydro-accumulator 20 is so great that the hydro-accumulator 20 normally does not receive brake fluid. Up to a maximum design pressure of the vehicle brake system 1, the hydro-accumulator 20 because of its pretension does not receive brake fluid. The maximum design pressure arises at an assumed maximum muscle force exerted on the brake pedal 8 when the full piston surface is effective, i.e. the piston surface of the first and second pistons 10, 11 together. If only the first piston 10 is moved, at the assumed maximum muscle force exerted on brake pedal 8, because of the smaller piston diameter of the first piston 10, the master brake cylinder pressure would be greater than the maximum design pressure with the full piston surface of the first and second pistons 10, 11. In this case as stated the pretensioned hydro-accumulator 20 receives the brake fluid displaced from the master brake cylinder 3 and thus reduces the pressure rise in the master brake cylinder 3 if the master brake cylinder pressure exceeds the maximum design pressure. The function of the pretensioned hydro-accumulator 20 is consequently to limit or at least reduce the rise in master brake cylinder pressure if this exceeds the maximum design pressure. The pretensioned hydro-accumulator 20 therefore has the function of preventing damage to the master brake cylinder 3 and/or other parts of the vehicle brake system 1 due to excessive pressure. Normally i.e. if the master brake cylinder pressure does not exceed the maximum design pressure, the hydro-accumulator 20 because of its pretension does not receive brake fluid and does not function. Because of the great pretension an increase in tension and hence pressure rise is relatively slight if the master brake cylinder pressure exceeds the maximum design pressure and consequently the hydro-accumulator 20 receives brake fluid.

The invention claimed is:

1. A hydraulic vehicle brake system of a motor vehicle comprising:
    a master brake cylinder including a first piston, a second piston, and a carrier device;
    a first brake circuit;
    an electric machine configured to be operated as a generator for decelerating the motor vehicle; and
    a hydro-accumulator configured to fluidly communicate with the master brake cylinder,
    wherein the carrier device is configured such that after movement of the first piston by a prespecified piston travel, the carrier device carries the second piston with the first piston,
    wherein a combined piston area of the first and second pistons active for displacement of brake fluid from the master brake cylinder is greater than a piston surface of the first piston active for displacement of brake fluid from the master brake cylinder,
    wherein the hydro-accumulator is configured to have a pretension such that the hydro-accumulator only receives brake fluid from the master brake cylinder when a master brake cylinder pressure is greater than a maximum design pressure of the vehicle brake system, and
    wherein the hydro-accumulator is configured such that the maximum design pressure is equal to or greater than an assumed maximum muscle force exerted on a brake pedal to move both the first and second pistons such that the hydro-accumulator only receives brake fluid from the master brake cylinder when only the first piston of the master brake cylinder moves.

2. The hydraulic vehicle brake system as claimed in claim 1, wherein the first piston lies within the second piston.

3. The hydraulic vehicle brake system as claimed in claim 1, further comprising a brake fluid storage reservoir, wherein:
    when the master brake cylinder is not activated, a pressure chamber of the master brake cylinder communicates with the brake fluid storage reservoir, and
    by a short movement of the first piston, the pressure chamber is isolated from the brake fluid storage reservoir.

4. The hydraulic vehicle brake system as claimed in claim 1, wherein the master brake cylinder is a tandem or multicircuit master brake cylinder for a dual-circuit vehicle brake system.

5. A method for operation of a hydraulic vehicle brake system of a motor vehicle, which comprises (i) a master brake cylinder having a first piston, a second piston, a third piston, and a carrier device, which after movement of a first piston over a pre-specified piston travel carries the second piston with the first piston, the master brake cylinder including a first chamber defined between (a) the first and second pistons and (b) the third piston, and a second chamber defined by the third piston remote from the first and second pistons, the first chamber being hydraulically connected to a first brake circuit and the second chamber being hydraulically connected to a second brake circuit, wherein a piston surface area of both pistons active for displacement of brake fluid from the master brake cylinder is greater than a piston surface of the first piston active for displacement of brake fluid from the master brake cylinder, the method comprising:
    during a service braking operation, closing an isolating valve, which connects the second brake circuit of the vehicle brake system to the second chamber of the master brake cylinder;
    during the service braking operation, operating an electric machine connected to the second brake circuit as a generator to decelerate the motor vehicle;
    during the service braking operation, generating a brake pressure with a hydraulic pump;
    regulating a wheel brake pressure in at least one wheel brake of the vehicle brake system depending on activation of the master brake cylinder and on a deceleration effect of the electric machine; and
    in response to a pressure in the first chamber exceeding a maximum design pressure, receiving fluid in a hydro-accumulator, which is positioned between the first chamber and the first brake circuit and is pretensioned to only receive fluid if the maximum design pressure is exceeded, to prevent damage to components in the first brake circuit.

6. The method as claimed in claim 5, the regulation of the wheel brake pressure further comprising operating at least one wheel brake pressure control valve to regulate the wheel brake pressure in the at least one wheel brake of the vehicle brake system.

7. The method as claimed in claim 5, wherein the master brake cylinder is a tandem or multicircuit master brake cylinder and the vehicle brake system comprises at least one further brake circuit which in service braking remains connected with the master brake cylinder.

8. The method as claimed in claim 5, wherein the hydro-accumulator is configured such that the maximum design pressure is equal to or greater than an assumed maximum muscle force exerted on a brake pedal to move both the first and second pistons such that the hydro-accumulator only receives brake fluid from the master brake cylinder when only the first piston of the master brake cylinder moves.

9. A hydraulic vehicle brake system of a motor vehicle comprising:
    a master brake cylinder including a first piston, a second piston, and a carrier device;
    a first brake circuit;
    a second brake circuit;
    an electric machine connected to the second brake circuit and configured to be operated as a generator for decelerating the motor vehicle; and
    a hydro-accumulator hydraulically connected between the first brake circuit and the master brake cylinder,
    wherein the carrier device is configured such that after movement of the first piston by a prespecified piston travel, the carrier device carries the second piston with the first piston,
    wherein a combined piston area of the first and second pistons active for displacement of brake fluid from the master brake cylinder is greater than a piston surface of the first piston active for displacement of brake fluid from the master brake cylinder, and wherein the hydro-accumulator is configured to have a pretension such that the hydro-accumulator only receives brake fluid from the master brake cylinder when a master brake cylinder pressure is greater than a maximum design pressure of the vehicle brake system.

10. The hydraulic vehicle brake system as claimed in claim 9, wherein:

the master brake cylinder includes a third piston, a first chamber is defined in the master brake cylinder between (i) the first and second pistons and (ii) the third piston, the first chamber being hydraulically connected to the hydro-accumulator and the first brake circuit; and a second chamber is defined by the third piston remote from the first and second pistons and is hydraulically connected to the second brake circuit.

11. The hydraulic vehicle brake system as claimed in claim 10, further comprising:

an isolating valve disposed in the second brake circuit configured to isolate the remainder of the second brake circuit from the second chamber, wherein the isolating valve is closed during a service braking operation to isolate the second brake circuit from the master cylinder.

12. The hydraulic vehicle brake system as claimed in claim 9, wherein the first piston lies within the second piston.

13. The hydraulic vehicle brake system as claimed in claim 9, further comprising a brake fluid storage reservoir, wherein:

when the master brake cylinder is not activated, a pressure chamber of the master brake cylinder communicates with the brake fluid storage reservoir, and by a short movement of the first piston, the pressure chamber is isolated from the brake fluid storage reservoir.

* * * * *